Oct. 27, 1970 J. A. VALLÉE 3,537,082

DECODER FOR SELF-CLOCKING DIGITAL MAGNETIC RECORDING

Filed April 19, 1968 2 Sheets-Sheet 1

INVENTOR
Johnny A. Vallée
BY Carl V. Olson
ATTORNEY

DECODER FOR SELF-CLOCKING DIGITAL MAGNETIC RECORDING

Filed April 19, 1968 2 Sheets-Sheet 2

INVENTOR
Johnny A. Vallée
BY Carl V. Olson
ATTORNEY

United States Patent Office 3,537,082
Patented Oct. 27, 1970

3,537,082

DECODER FOR SELF-CLOCKING DIGITAL MAGNETIC RECORDING

Johnny A. Vallee, Juno Beach, Fla., assignor to RCA Corporation, a corporation of Delaware
Filed Apr. 19, 1968, Ser. No. 722,660
Int. Cl. G11b *51/06;* G08c *13/00*
U.S. Cl. 340—174.1 4 Claims

ABSTRACT OF THE DISCLOSURE

A system for decoding the "1" and "0" digits in successive bit cells of a self-clocking information signal read from a magnetic recording medium. The code may be one in which a transition occurs in the middle of a bit cell containing a "1," and a transition occurs between successive bit cells containing "0's." Synchronizing pulses are derived from the information signal and are passed through a voltage-controlled delay to the synchronizing input of a phase-locked oscillator which generates a clock signal. The control signal internally generated in the phase-locked oscillator to synchronize the oscillator is also employed to control the delay in the voltage-controlled delay, so that the relative phase of the clock and information signals remains constant despite changes in speed of the recording medium.

BACKGROUND OF THE INVENTION

An increased amount of digital information can be recorded on a magnetic drum or tape using a "self-clocking" code in which information is represented by signal transitions, regardless of polarity, rather than by pulses or levels. A particularly desirable self-clocking code is one in which a transition occurs in the middle of a bit cell containing a "1" and a transition occurs between successive bit cells containing "0's." A clock signal can be derived from the information signal for use in decoding the information signal. Decoding involves identifying whether the transitions occur in the middle of, or between, bit cells, and generating a corresponding conventional non-return-to-zero signal in which bit cells containing "1's" have one level and bit cells containing "0's" have another level. The clock signal used for decoding must be synchronous with the information signal, and the clock signal is synchronous because it is derived from the information signal. The clock signal remains synchronous with the information signal despite changes in frequency due to unavoidable minor variations in the speed of movement of the magnetic recording medium.

SUMMARY OF THE INVENTION

Even though the clock is synchronous with the information signal, the output of the decoder may contain errors due to variations of the phase or timing of the clock relative to the information signal. It is therefore a general object of this invention to improve the performance of a digital magnetic recording system by providing improved means to maintain a proper phase relation between the clock and self-clocking information signals despite variations in the speed of motion of the recording medium. This is accomplished by means for passing synchronizing pulses derived from the information signal through a voltage-control delay circuit to the synchronizing input of a phase-locked oscillator. The control voltage internally generated in the oscillator to maintain the oscillator in synchronism is also applied to the voltage-controlled delay circuit to delay the synchronizing pulses an amount proportional to the period of the oscillator.

DESCRIPTION OF THE PREFERRED EMBODIMENT

Figure 1:
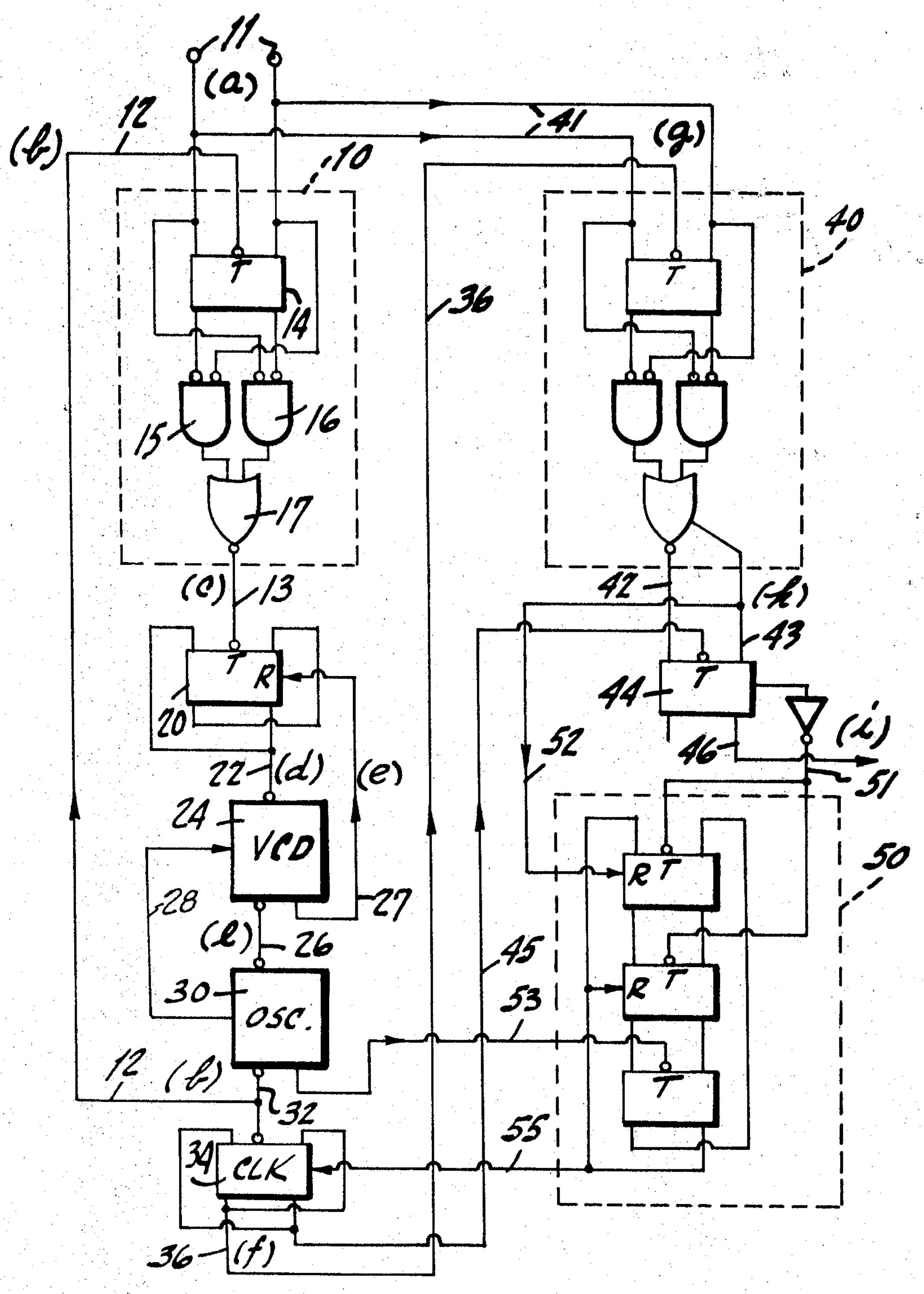
FIG. 1 is a block diagram of a decoder constructed according to the teachings of the invention.

FIG. 1 shows a decoder for a self-clocking digital information signal reproduced from a magnetic recording medium such as a magnetic drum. The decoder includes a digital differentiator 10, which is receptive to the reproduced information signal and its complement from input terminals 11, which is receptive to a square wave oscillation over line 12, and which provides an output on line 13. The input signal at the left one of terminals 11 is a signal as shown in FIG. 2*a* in which a transition occurs in the middle of a bit cell containing a "1," and a transition occurs between successive bit cells containing "0's." The oscillations applied over line 12 to differentiator 10 are as shown in FIG. 2*b*. The output signal from the differentiator 10 on line 13 is as shown in FIG. 2*c*.

The digital differentiator 10 is a known unit which produces an output pulse (FIG. 2*c*) for every transition regardless of polarity in the input signal (FIG. 2*a*). Each output pulse has a leading edge determined by an input signal transition, and has a trailing edge determined by a next following negative-going transition of the input square wave oscillation (FIG. 2*b*). The digital differentiator 10 includes a conventional shift-register microelectronic flip-flop 14 which is an integrated circuit unit usually including three interconnected set-reset flip-flops, each of which is made up of two interconnected gates. The differentiator 10 also includes two "and" gates 15 and 16 and an "or" gate 17 arranged as an exclusive "or" group.

The output at 13 of the digital differentiator 10 is connected to the trigger input T of a triggerable flip-flop 20. The flip-flop 20 is an integrated circuit unit like flip-flop 14, but it differs therefrom in that it is provided with cross-connections between its outputs and inputs so that it operates as a triggerable flip-flop. The output at 22 of the triggerable flip-flop 20 is connected to the input of a voltage controlled delay circuit 24.

The voltage controlled delay circuit 24 may be any suitable known unit such as one of the type including a capacitor, a transistor biased to supply a constant charging current to the capacitor, a transistor for supplying an additional charging current to the capacitor in an amount determined by an analog input control voltage, a threshold detector and pulse generator to generate an output pulse when the voltage on the capacitor reaches a given value, and a latch circuit to prevent charging of the capacitor in the interval between generation of the delayed output pulse and receipt of an input pulse.

The voltage controlled delay circuit 24 produces narrow output pulses or spikes on lines 26 and 27 at a time which is delayed relative to the time of the leading edge of a negative input pulse applied thereto on line 22. The amount that the output pulse or spike is delayed is determined by the amplitude of a controlled voltage applied to the voltage controlled delay circuit 24 over line 28 from a synchronized oscillator 30. The delayed output pulse from the voltage controlled delay circuit 24 on line 26 is applied to the synchronizing input of the synchronized oscillator 30. The complement output of delay circuit 24 on line 27 is applied to the reset input R of the triggerable flip-flop 20.

The synchronized oscillator 30 may be an suitable square wave oscillator having a sufficient flywheel effect and including a phase comparator receptive to the internally-generated oscillations and to the input synchronizing pulses. The phase comparator generates a control voltage which is internally applied to the oscillator to maintain the oscillations in synchronism with the synchronizing pulses. The control voltage internally generated and utilized in the synchronized oscillator 30 is also taken out from the oscillator 30 over line 28 and employed as a control voltage for the voltage controlled delay circuit 24.

An output 32 of the synchronized oscillator is connected over line 12 to the trigger input T of the flip-flop 14 in the digital differentiator 10. The oscillator output 32 is also applied as a synchronizing input to a triggerable flip-flop clock oscillator 34.

The portion of the system of FIG. 1 which has thus far been described is a means for deriving a clock pulse wave from the input information signal available at input terminals 11. The derived clock pulse wave is employed to decode the input information signal, as follows. An output of the clock 34 on line 36 is applied to the trigger input T of a decoding digital differentiator 40. The input information signal is coupled from input terminals 11 over lines 41 to the differentiator 40. The differentiator 40 is similar in construction to the differentiator 10. Two complementary outputs at 42 and 43 from the differentiator 40 are coupled to a flip-flop 44. The flip-flop 44 also receives a complement output from the clock 34 over line 45. The output of flip-flop 44 on line 46 is a decoded conventional NRZ (non-return-to-zero) signal in which information bit cells containing "1's" are represented by one voltage level, and information bit cells containing "0's" are represented by another different voltage level.

The circuit 50 is included because the clock pulse wave (FIG. 2*f*) derived from the input information signal may have a correct or an incorrect polarity. The derived clock pulse wave must have the correct polarity in order that the information signal be correctly decoded. If the clock pulse wave has the incorrect or wrong polarity, this fact is detected by the circuit 50. The circuit 50 is receptive to "0"-representing pulses over line 51 from the register 44, a transition-representing signal over line 52 from the differentiator 40, and a positive edge of an oscillation over line 53 from the oscillator 30. The circuit 50 detects an incorrect decoding of the information signal by detecting a condition in which two successive bit cells are decoded as containing "0's" without having an intervening partition transition therebetween. When this condition is detected, it is known that the derived clock pulse wave has an incorrect polarity, and the circuit 50 automatically reverses the polarity of the clock pulse wave by applying a pulse over line 55 to the clock 34. The circuit 50 is not described in greater detail herein because it is not essential to an understanding of the present invention.

Figure 2:
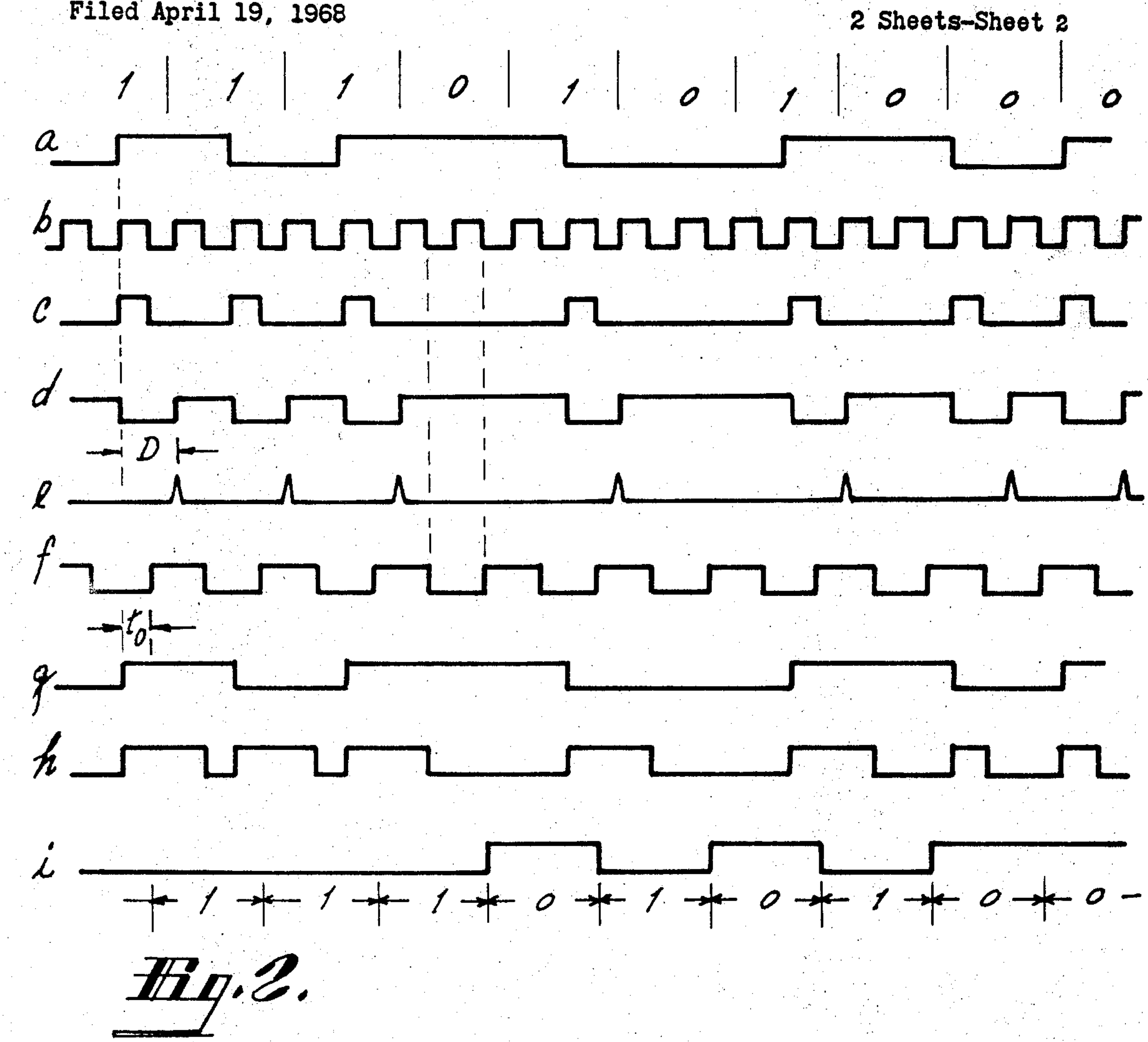
FIG. 2 is a chart of voltage waveforms which will be referred to in describing the operation of the decoder of FIG. 1.

Reference will now be made to the voltage waveforms of FIG. 2 in connection with a description of the operation of the means in FIG. 1 for deriving a clock pulse wave from the input self-clocking information signal. The input information signal may be as shown in FIG. 2*a* wherein the information bit cells are shown separated by imaginary vertical partition lines. The cells containing "1's" have centrally located transitions, and successive bit cells containing "0's" have transitions therebetween. The digital differentiator 10 produces output pulses as shown in FIG. 2*c* at times corresponding with the times of transitions in the input information signal. The leading edge of a pulse of FIG. 2*c* applied to triggerable flip-flop 20 initiates an output pulse (FIG. 2*d*) which is applied over line 22 to the voltage controlled delay 24. The leading edge of a negative pulse (FIG. 2*d*) applied to delay circuit 24 results in an output pulse or spike (FIG. 2*e*) which is delayed an amount D. The output spike is returned over line 27 to the reset input R of the triggerable flip-flop 20 to reset the flip-flop and make it ready for the next following input pulse. The output spike of the delay circuit 24 is delayed an amount D which is determined by the amplitude of the control voltage applied to the input 28 of the voltage-controlled delay circuit 24. The delay D is manually adjusted to a nominal value to provide a desired timing relationship in the system when the magnetic medium is moving at a nominal or average speed. At higher or lower speeds, the amount of the delay is automatically varied.

The delayed output spikes from the delay circuit 24 are applied over line 26 as a synchronizing pulse input to oscillator 30. The synchronized oscillations from the oscillator 30 are as shown in FIG. 2*b*. These oscillations are applied as synchronizing oscillations to the clock 34. The clock 34 has a natural period of oscillation equal to a bit cell period, which is twice as great as the period of oscillations from oscillator 30. The output of the clock 34 is then as shown in FIG. 2*f*, and has a polarity as shown. If the clock pulse wave of FIG. 2*f* has the opposite polarity from that shown, the polarity is reversed automatically by the circuit 50.

The synchronized clock pulse wave provided by the clock 34 is employed to decode the information signal applied over lines 41 to the decoder, which includes the digital differentiator 40 and the flip-flop 44. The input information signal shown in FIG. 1*a* is repeated in FIG. 2*g*. The output of clock 34 on line 36 is applied to the trigger input T of the digital differentiator 40, and the complement of the clock pulse signal is applied over line 45 to the trigger input T of the flip-flop 44. The output on line 43 from the differentiator 40 is as shown in FIG. 2*h*. The output on line 46 of the decoder is shown in FIG. 2*i* to consist of a conventional NRZ signal in which bit cells containing "1's" have one voltage level, and bit cells containing "0's" have another voltage.

The synchronized oscillator 30 and the clock 34 are constructed so that the synchronizing spikes of FIG. 2*e*, which are delayed a nominal amount D, cause the clock pulse wave of FIG. 2*f* to have negative half cycles centered on the middle of bit cells, and to have positive half cycles centered on the partitions between bit cells. This is shown by the clock pulse wave of FIG. 2*f* and the information signal of FIG. 2*g* (FIG. 2*a* repeated). The time relation between two convenient positive-going edges is labeled $t_0$. This nominal time relation provides an optimum phase relation for decoding the information signal when the magnetic recording medium is moving at its nominal or average physical speed.

Figure 3:
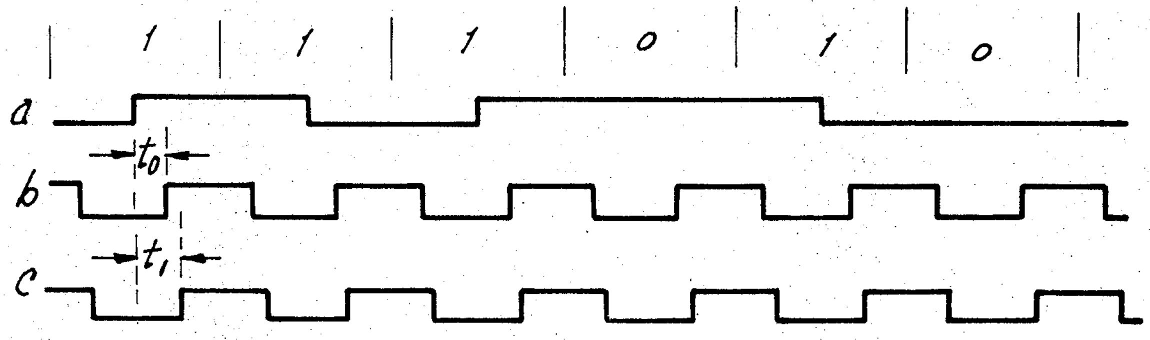
FIG. 3 is a chart of voltage waveforms which will be referred to in describing phase relation changes in the decoder resulting from changes in the physical motion of the recording medium.

Reference is now made to FIG. 3 for a description of timing conditions when the magnetic recording medium is moving at a speed which is slower than the nominal speed. Under this condition, the information bit cells of the information signal are relatively longer in time, as represented in FIG. 3*a*. The clock pulse wave, being derived from the information signal, is synchronous with the information signal and also has a correspondingly longer period. However, a change in the delay provided by the voltage controlled delay 24 is necessary in order to make the clock pulse wave have a correct phase relation in which negative half cycles are centered on the middles of bit cells and positive half cycles are centered on portions between bit cells. The maintenance of this correct phase relation is necessary to minimize the possibility of errors in the decoding of the information signal.

In the absence of a change in the delay provided by the voltage controlled delay circuit 24, the clock pulse wave of FIG. 3*b* has the same time displacement $t_0$ with relation to the information signal that it had at the nominal speed represented in FIGS. 2*f* and 2*g*. The clock pulse wave of FIG. 3*b* is not properly centered relative to the information signal for reliably decoding the signal.

However, according to the invention, the delay provided by the voltage controlled delay circuit 24 is changed, and is changed in proportion to the change in speed of the recording medium, and in accordance with the change in the periods of the oscillator 30 and the clock 34. The delay D in FIG. 2*e* is increased, so that the displacement $t_0$ of FIGS. 2*f* and 3*b* are increased to the value $t_1$ of FIG. 3*c*. This proportional increase in the displacement to the value $t_1$ causes the clock pulse wave to have negative and positive half cycles centered with relation to bit cell middles and partitions, respectively. A proportional change in the opposite direction is similarly made when the speed of the recording medium is greater than the nominal or average value.

What is claimed is:

1. The combination of:

means responsive to an information signal to generate synchronizing pulses, a voltage controlled pulse delay circuit operative to delay said synchronizing pulses an amount determined by a voltage applied to a control input terminal thereof, a synchronized oscillator having a synchronizing input connected to the output of said voltage controlled pulse delay circuit and having an internally-generated control voltage which maintains the oscillator in synchronism, and means coupling the control voltage in said synchronized oscillator to the control input terminal of said pulse delay circuit to make the delay therein of the synchronizing pulses vary in proportion with the period of the oscillations in said oscillator, so that the phase of said oscillations relative to said information signal remains constant.

2. The combination defined in claim 1, and in addition, means utilizing said information signal and said oscillations to decode said information signal.

3. In a system for decoding the "1" and "0" digits in successive bit cells of a self-clocking information signal read from a magnetic recording medium, means responsive to said information signal and to a derived clock signal and operative to produce an output pulse at every transition of said information signal, a voltage controlled pulse delay circuit operative to delay said output pulses an amount determined by a voltage applied to a control input terminal thereof, a synchronized oscillator for generating said clock signal, said oscillator having a synchronizing input connected to the output of said voltage controlled pulse delay circuit and having an internally-generated control voltage which maintains the oscillator in synchronism, and means coupling the control voltage in said synchronized oscillator to the control input terminal of said pulse delay circuit in an amplitude and polarity to make the delay therein vary in proportion with the period of said clock signal, so that the phase of said clock signal relative to the bit cells of said information signal remains constant despite changes in the periods of said clock signal and information bit cells due to variations in the relative speed of physical motion of said recording medium.

4. In a system for decoding the "1" and "0" digits in successive bit cells of a self-clocking information signal read from a magnetic recording medium having a non-constant physical motion, a digital differentiator responsive to said information signal and a synchronized oscillation signal and operative to produce an output pulse at every transition of said information signal, a voltage controlled pulse delay circuit responsive to the output of said digital differentiator and operative to provide output pulses delayed an amount determined by an input control voltage, a phase locked oscillator having a period equal to half a bit cell and having a synchronizing input connected to the output of said voltage controlled pulse delay circuit and operative to generate a control voltage which maintains the oscillator output oscillations in synchronism with the input pulses, means coupling the output of said phase locked oscillator to the oscillation input of said digital differentiator, means synchronized by the output of said phase locked oscillator to generate a clock pulse wave having a period equal to a bit cell period and having a ninety degree phase relation therewith, and means coupling the control voltage in said phase locked oscillator to the control input of said pulse delay circuit to make the delay therein vary in accordance with the period of said oscillations so that the phase of said clock pulse wave relative to said information signal bit cells remains constant despite changes in the period of said clock pulse wave and bit cells due to changes in the speed of physical motion of said recording medium.

References Cited

UNITED STATES PATENTS

| | | | |
|---|---|---|---|
| 3,414,894 | 12/1968 | Jacoby | 340—174.1 |
| 3,422,425 | 1/1969 | Vallee | 340—347 |
| 3,448,445 | 6/1969 | Vallee | 340—347 |

JAMES W. MOFFITT, Primary Examiner

V. P. CANNEY, Assistant Examiner

U.S. Cl. X.R.

340—347